Oct. 20, 1931.   F. G. BACK   1,828,141
APPARATUS FOR TAKING PHOTOGRAPHS OF CAVITIES OF THE BODY
Filed Feb. 20, 1929   2 Sheets-Sheet 1
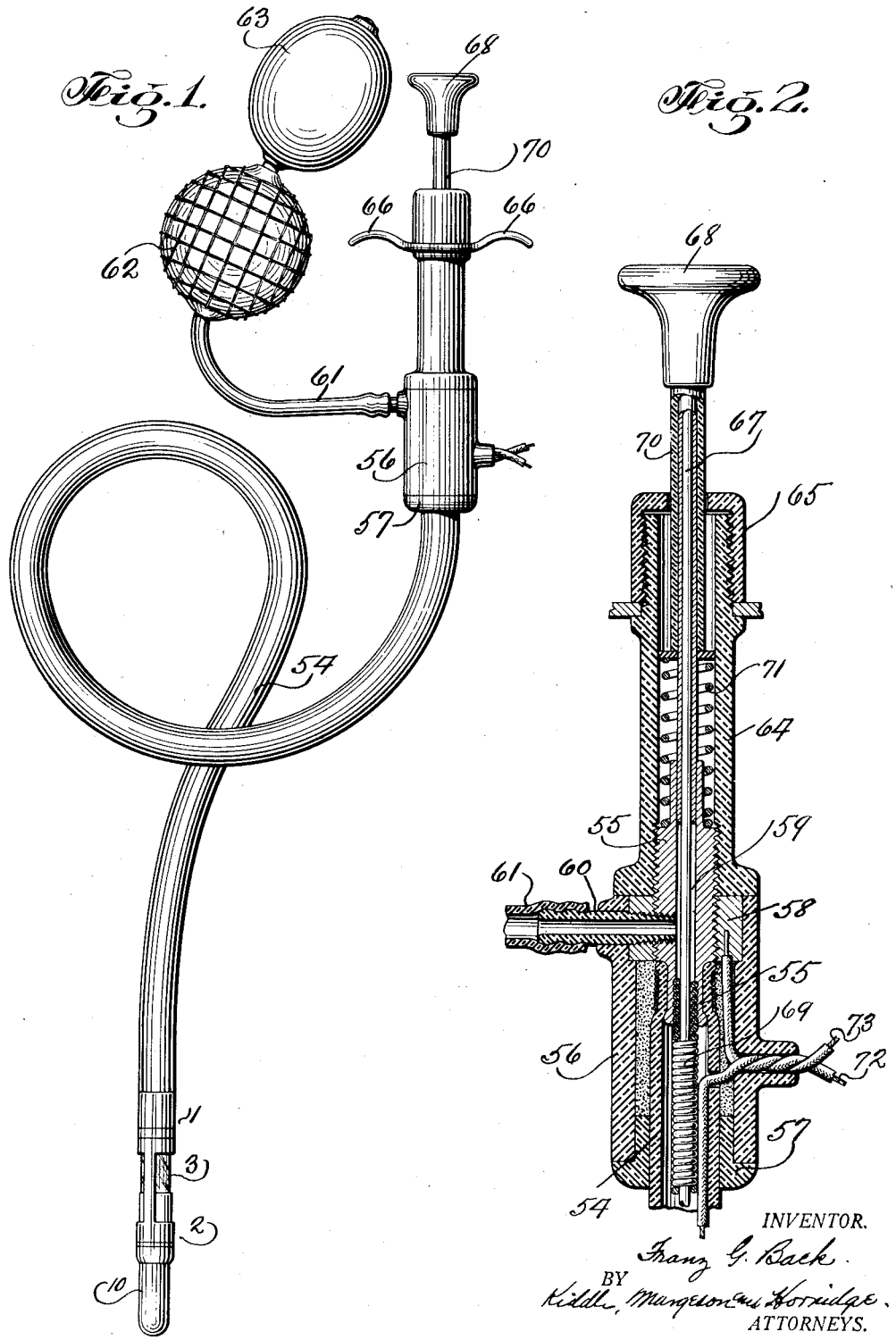

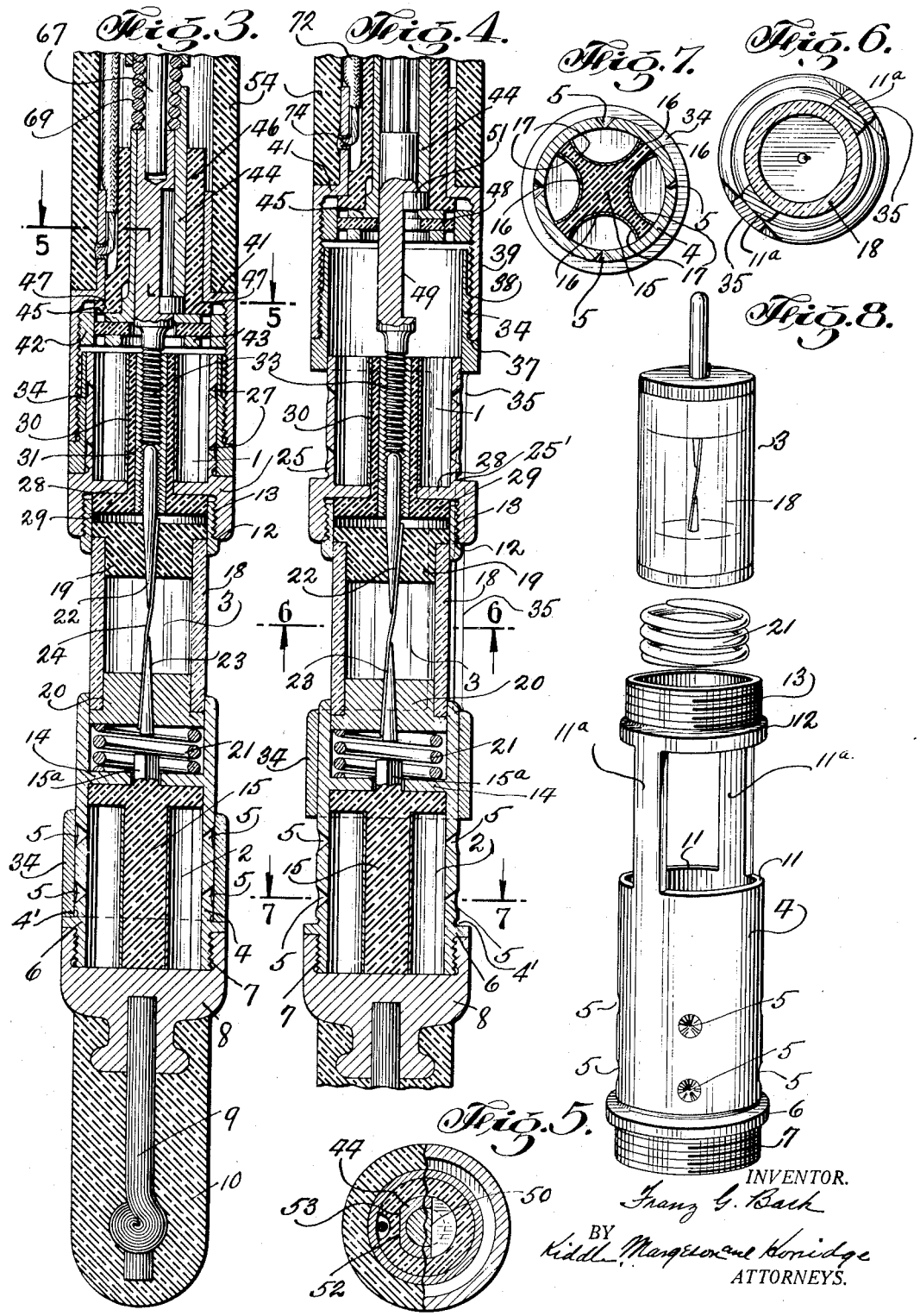

Patented Oct. 20, 1931

1,828,141

UNITED STATES PATENT OFFICE

FRANZ G. BACK, OF STAMFORD, CONNECTICUT, ASSIGNOR, BY MESNE ASSIGNMENTS, TO THE PHOTOR CORPORATION, OF NEW YORK, N. Y., A CORPORATION OF NEW YORK

APPARATUS FOR TAKING PHOTOGRAPHS OF CAVITIES OF THE BODY

Application filed February 20, 1929. Serial No. 341,310.

This invention relates to an improved device for photographing the walls of a cavity. I am aware that devices for this purpose have been proposed heretofore, but such devices have been impracticable for general commercial use for the reason that the lighting means employed for illuminating the cavity have been insufficient to give the desired illumination for securing instantaneous pictures, as distinguished from time exposures, of the requisite clearness and definition, and owing to the character of the lighting means employed the same could not be used for time exposures.

One of the objects of my invention, therefore, is the provision of a device of the general character above mentioned which is so constructed and arranged that the same may be operated for a sufficient length of time and with sufficient intensity, so far as the intensity of the light source is concerned, to produce photographs of the desired clearness and definition and which photographs are hence far superior to photographs obtainable with other devices prior to this invention.

A still further object of this invention is the provision of a device adapted for photographing the walls of a cavity in which the parts are so constructed as to simplify manufacture and assembly and facilitate operation of the device by persons who may be unskilled in the art of photography, such as physicians and surgeons for example.

Another object is the provision of lighting means wherein a filament of tungsten or other high refractory metal is vaporized thus giving a light of great intensity, and high actinic properties for a sufficient duration of time to produce photographs rich in contrast and of sharp definition.

While my device is adapted for photographing cavities of any nature, for the purposes of this application I have illustrated an assembly which is particularly well adapted for photographing body cavities such as photographing the interior of the stomach for example, and the device will be described in this connection. It is to be distinctly understood, however, that this showing is merely by way of definition and clarity of description and is not in any sense to be taken as definitive.

In general the present invention provides a photographing apparatus which may be carried at the end of a soft rubber tube when the device is to be employed for photographing body cavities and in all its dimensions is comparatively small so as to adapt the same for photographing the interior of the stomach for instance, it being understood that the device is inserted in the stomach in much the same manner as an ordinary stomach pump.

The apparatus which is taken into the cavity being photographed comprises films or other light sensitive surfaces on which the photographs are to be made and a light source, power for this light source or lighting device being supplied thereto from the exterior of the device as will be explained hereinafter.

Inasmuch as it may be desirable in some instances to distend the cavity being photographed, I have provided means for accomplishing this result in the form of a pump adapted to pump air through the device and into the cavity to cause distension thereof.

The device as a whole is so constructed that the same may be readily assembled even by the unskilled so far as the insertion of the films or other light sensitive surfaces employed therewith are concerned. I have also provided means for preventing the entry of foreign material into the device when the same is being inserted in the cavity being explored so that I am assured that at all times the apparatus will be in condition for use. The device also provides a construction in which the chances of injury to the cavity being photographed, as for instance the stomach, are eliminated.

As above mentioned, my improved device has been constructed with a view to simplifying the assembly thereof so far as possible in order that the device may be successfully manipulated by persons who may have no special skill in photography and to this end the light source and camera assembly is such that the exposed films may be readily removed and new films substituted and so that the lighting device or light source may likewise be quickly and readily removed and the filament employed therein quickly and readily replaced, this filament owing to the character of the light source employed being replaced by a new filament after each operation of the device.

More specifically, the device of this invention provides a construction wherein two cameras are employed with a light source intermediate the same, the cameras and light source being of such a character as to enable the entire interior of the cavity to be photographed during one exposure. In other words my apparatus will photograph or cover an angle of 360°. In addition a plurality of pictures or photographs are taken on the one exposure which enables me to obtain pictures giving more or less a stereoscopic effect.

In the drawings accompanying this application,

Fig. 1 is a view showing the complete assembly;

Fig. 2 is a fragmentary view, on an enlarged scale, of the mechanism by which the cameras are manipulated when using the apparatus;

Fig. 3 is a sectional elevational view showing the cameras, light source, etc. with the parts in position for insertion of the device into the cavity to be photographed;

Fig. 4 is a view similar to Fig. 3 showing the parts in position ready for the making of an exposure;

Fig. 5 is a section taken substantially on the line 5—5 of Fig. 3;

Fig. 6 is a section through the light source taken on the line 6—6 of Fig. 4;

Fig. 7 is a section on the line 7—7 of Fig. 4; and

Fig. 8 is a view illustrating the manner of assembly and taking down of the apparatus.

My improved device comprises two cameras, an upper camera designated 1 and a lower camera designated 2, with a light source or lighting means 3 intermediate the same. The cameras 1 and 2 and light source 3 are tubular in form and longitudinally alined.

The lower camera 2 comprises a tubular member 4, provided in the walls thereof with four sets of pin hole diaphragms 5. The lower end of the camera 2 is shouldered at 6 and screw threaded at 7 for the purpose of receiving a cap 8 which when in place abuts the underside of shoulder 6, the cap 8 being provided with a core member 9 and a soft rubber tip 10. The tip 10 constitutes the lower end of the apparatus as a whole—in other words, it is the part of the device which is first inserted in the cavity to be photographed.

The wall of tube 4 above the openings or diaphragms 5 therein is cut away or cut out as shown at 11, for example, to provide a skeleton structure 11a extending longitudinally of the tube. The upper end of this structure is shouldered as shown at 12 and screw threaded at 13.

The interior of the tube 4 a short distance below the part designated 11 is provided with an internal transverse partition 14. Below and abutting this partition is a removable spider 15 of suitable insulating material, as for instance hard rubber or bakelite, this spider being provided with longitudinally-extending curved faces 16 which are disposed at an angle of 90° with respect to each other. Each of these curved surfaces 16 is preferably equidistant from the inner end of the pin hole diaphragms 5, the curve thereof being struck with the inner ends of the diaphragms as a center.

The spider 15 is provided for the purpose of receiving light sensitive members such as films 17 which are shown in place in Fig. 7 for instance, and the spider together with the films are held firmly but removably in position by the cap 8 above referred to. The upper face of this cap, as will be seen from Fig. 3, bears against the lower end of the spider to clamp the same between the cap and the partition 14. Rotation of the spider 15 is prevented by the square boss 15a which extends upwardly through a square hole in partition 14.

When it is desired to remove the films or light sensitive member 17 or to reload the camera, it will only be necessary to unscrew the cap 8 and remove or partially remove the spider 15, whereupon the films will drop out automatically or new films may be loaded into the camera. This eliminates the necessity of handling the films after exposure.

The light source or lighting means which as a whole is designated 3 is in the form of a tubular member having a glass wall 18 closed at each end by caps 19 and 20. Cap 19 is of suitable insulating material, the cap 20 of metal. This tubular member passes into the upper end of the camera tube 4 and rests upon a contact spring 21 which in turn seats or rests upon the upper face of the internal partition 14.

The insulating cap member 19 is provided with an electrode 22 and the cap 20 with a similar electrode 23. These electrodes are tapered and secure the ends of a filament 24 in place in the caps 19 and 20. This filament is composed of a highly refractory material, preferably tungsten, and is jammed or clamped at each end between electrodes 22 and 23 and the caps 19 and 20, respectively.

The upper camera 1 comprises a tubular member 25 internally threaded so as to telescope and be threaded upon the threaded portion 13 of tube 4. The walls of the tube 25 are provided with four sets of pin hole apertures or diaphragms 27 similar to the pin hole diaphragms 5 in the lower camera. The lower end of tube 25 is provided with the transverse partition 28 and receives a removable spider 29 which is similar to the spider 15 in the lower camera. The head of spider 29 abuts against the underside of the partition 28, the body portion of the spider extending upwardly through the partition 28 and longitudinally of the tube 25. Spider 29 is also provided with curved surfaces similar to the surfaces or faces 16 in the lower spider 15 for receiving films 30. The spider is molded about a metal bushing or short tube 31 which is threaded internally, the upper end of the electrode extending into this bushing as shown on Fig. 3. The bushing receives from its upper end a screw threaded member 33 which will be described in more detail hereinafter. The spring contact 21 by its tendency to move the light assembly upwardly insures good contact at each end of the assembly.

The exterior of the device is provided with a shutter mechanism for the two cameras and also the necessary mechanism for shifting the cameras relatively to the shutter. This shutter mechanism comprises a tube 34 surrounding both cameras and cut away intermediate its ends to provide a skeleton portion 35 which lies abreast of 11a of the tubular member 4. The tube 34 has a sliding fit on the camera tubes and when in closed position with the diaphragms 5 covered or closed, as shown in Fig. 3, presents a smooth surface for the passage of the device into the cavity to be photographed. This prevents the entry of any foreign material into the diaphragms during the process of insertion of the device into the cavity, while the smooth surface facilitates the insertion of the device and also prevents injury to the membrane of the cavity to be photographed. At 4' tube 4 is grooved, and when the tube is moved outwardly of the shutter this groove creates a slight vacuum sufficient to break any mucous film which otherwise might tend to form between the shutter and camera. The camera 25 is provided with a similar groove 25'. The upper end of the shutter tube is reduced in diameter to provide a shoulder 37 and threaded externally as shown at 38. The threads at 38 are of a different pitch from those on the lower end of member 33. Upon this threaded portion 38 is screwed an open ended metal cap 39 which is reduced in diameter at its upper end to provide a shoulder 41 within the cap. Screwed into the cap 39 from the lower end thereof to a point adjacent the shoulder 41 but spaced a short distance therefrom is a ring 42 provided internally with a spider 43.

Surrounding the upper part of the stem of the threaded member 33 above referred to is a tubular metal member 44 provided at its lower end with a flange 45. Surrounding this tubular member 44 is a tube of insulation 46 in turn provided with a flange 47 at its lower end. The flange 47, and the flange 45 at the lower end of the tubular member 44, both underlie the shoulder provided at 41 on the member 39 so that the ring 42 clamps an insulating washer 48, tubular member 44, insulating tube 46 against the shoulder 41 on the member 39 holding all of these members together as a unit.

The stem of the threaded member 33 from a point above the top of the upper camera 1 is cut away as shown at 49 and this cut out portion is provided with a plane face 50 as shown in Fig. 5, this face cooperating with a key 51 which passes through one wall of the metal tube 44. One side of the tubular member 44 is flattened as shown at 52, this side being opposed to the key 51, and the tube of insulation 46 which immediately surrounds this tube is correspondingly flattened as shown at 53. These flattened surfaces facilitate assembly of the apparatus and prevent rotation of the parts during manipulation, as will be pointed out hereinafter.

Surrounding the reduced upper end of the metal tube 39 is a soft rubber tube 54 constituting a carrier for the cameras and lighting device.

The rubber tube 54 as will be seen from Fig. 1 is of substantial length and at the upper end thereof is forced over the lower end of a metal nipple 55 within a hard rubber or bakelite housing 56. The latter is provided at its lower end with a cap 57 which receives the soft rubber tube 54 as illustrated. Screwed upon the nipple 55 is a metal ring 58 which if desired may be molded into the housing 56.

Passing laterally through one wall of the housing 56 and through the ring 58 and nipple 55 so as to communicate with the bore 59 in the nipple is a nipple 60 of insulating material, this nipple receiving the end of a rubber tube 61 which is connected to a control bulb 62 and press bulb 63. The purpose of these two bulbs, as will be pointed out hereinafter, is to enable air to be pumped through the tube 54 into the cavity being photographed. Screwed upon the upper end of the nipple 55 is a hard rubber tube 64 capped at 65 and provided with two arms 66.

Extending into the cap is a shutter operating member 67 having a knob 68 at the extreme upper end thereof, the member 67 extending lengthwise of the device and being connected to the upper end of the member 33 as shown in Fig. 3. The member 67 is preferably surrounded by the wire coil 69 to stiffen the member 67 so that the cameras may be moved with respect to the shutter but at the same time giving the desired flexibility.

For maintaining the cameras in closed position, the operating member 67 is provided with a stem 70, the lower end of which is adapted to engage a spring 71 within the tube 64, the lower end of this spring resting upon the upper end of the nipple 55. This spring is compressed when the operating member 67 is moved downwardly to move the cameras to position where their diaphragms are open ready for the taking of a photograph.

The current for operation of the lighting means 3 is supplied through conductors 72 and 73. The conductor 72 passes downwardly through the tube 54 and is anchored to the reduced portion of the metal tube 39 as shown at 74, while the other conductor 73 is fastened to the metal ring 58 within the housing 56. Current of sufficient voltage and amperage taken from any suitable source of supply is conducted by wire 73 to the filament 24 which is of tungsten or other highly refractory material, the return circuit being cap 20, camera tube 4, shutter mechanism 34, tube 39 and wire 72. The impressed current should be of sufficient duration to vaporize the filament, the metal vapor thus formed and which represents a highly ionized gas functioning as the conductor for the current to produce a luminous discharge bluish-white or blue in color.

I have found that if the filament between the electrodes is about 2 m. m. in length and .08 m. m. in diameter, and that a current of about 420 volts and 150 amperes is impressed for 1/120 of a second, the tungsten or other highly refractory filament will be vaporized, with the results above noted. The light thus created will be sufficient to produce pictures rich in contrast and of sharp definition.

When inserted in the cavity to be photographed, the cameras are in closed position. If necessary or desired the bulb 63 may be operated to force air through the apparatus into the cavity to be photographed to distend the same, it being understood that the air escapes past the various joints in the lower end of the device. The operating member 67 is then depressed against the action of the spring 71 and this will move the cameras and light source downwardly relative to the shutter tube 34 to open the diaphragms in both the upper and lower cameras. Current is then supplied to the filament 24.

It will be seen, therefore, that I have provided a device for photographing cavities which is particularly adapted for photographing body cavities in which the cost of manufacture and assembly, as compared with existing devices for like purposes, has been reduced, owing to the simplicity of my construction and in which photographs can be made of the cavity of the desired clearness and definition.

It will be seen also that I have provided an apparatus for photographing cavities which is so constructed and arranged that the same may be operated readily by those not specially skilled in photography with good results and that means have been provided whereby the cavity being photographed may be illuminated to the desired extent without carrying the time of exposure to a point where the same is detrimental to the results desired or to the cavity being photographed.

It is evident that various modifications may be made in the construction above described within the purview of this invention.

What I claim is:—

1. In apparatus of the class described, the combination of a pair of tubular cameras, a lighting device intermediate the same, the lighting device being resiliently mounted between the adjacent ends of the cameras.

2. In apparatus of the class described, the combination of a pair of tubular cameras, a lighting device intermediate the same, said lighting device being in the form of a transparent tube capped at each end, and a spring intermediate one of said caps and a portion of one of said tubes.

3. In apparatus of the class described, the combination of a pair of tubular cameras, a tubular lighting device intermediate the same, the said cameras being provided near their adjacent ends with inwardly extending flanges or shoulders, a cap for one end of said lighting device, a spring intermediate said cap and one of said shoulders or flanges, and an extension on the adjacent end of the other camera telescoping said lighting device.

4. In apparatus of the class described, the combination of two tubular cameras, a lighting device intermediate the same and arranged in telescoping relation thereto, an inwardly extending flange within each camera tube near the adjacent ends thereof, and a film retaining spider in each camera, each of said spiders being provided with a flanged end lying between the flanges on the cameras and the ends of the lighting device.

5. In apparatus of the class described, the combination of two tubular telescoping cameras detachably attached to each other, a lighting device intermediate the same, each of said cameras being provided with an internal inwardly extending flange, a light tube intermediate said cameras, a cap for each end of said light tube, a film holding spider for each camera, each of said spiders being provided with a head lying intermediate the caps on the ends of said light tube and the said flanges on the camera tube.

6. In apparatus of the class described, the combination of two tubular cameras telescoping and detachably attached to each other, a lighting device intermediate the same, shutter mechanism surrounding the cameras, and a reinforced wire extending to the exterior of the device for moving said cameras and lighting device relatively to the shutter mechanism.

7. In a device of the class described, the combination of two tubular cameras, a lighting device intermediate the same, means for detachably attaching said cameras and lighting device to each other to provide a unitary structure, shutter mechanism for the cameras, means operable from the exterior of the camera for moving the cameras relatively to the shutter mechanism, and means for automatically restoring the cameras to their original position.

8. In apparatus of the class described, the combination of two tubular cameras, a lighting device intermediate the same, shutter mechanism for said cameras, means for moving the cameras and lighting device relatively to said shutter mechanism and operable from the exterior of the device, and a spring for restoring the cameras to their original position with respect to the shutter mechanism.

9. In apparatus of the class described, the combination of two cameras, a lighting device intermediate the same, said cameras and lighting device being detachably secured to each other to provide a unitary structure, shutter mechanism on the exterior of the cameras, means exterior of the device for moving the cameras relatively to the shutter mechanism, a spring for restoring the cameras to their original position, and means for supplying air to the interior of the apparatus and for expelling the air therefrom.

10. In apparatus of the class described, the combination of two cameras, a lighting device intermediate said cameras, said cameras and lighting device being rigidly secured to each other, shutter mechanism exterior of said cameras, rigid means attached to one of said cameras and operable from the exterior thereof for moving the cameras relatively to said shutter mechanism, and means for limiting such movement of the cameras.

11. In apparatus of the class described, the combination of two cameras, a lighting device intermediate the same, shutter mechanism for said cameras, rigid means attached to one of said cameras and operable from the exterior thereof for moving both cameras and the lighting device relatively to the shutter mechanism, said means being provided with a keyway, and a key rigid with the shutter mechanism cooperating with said keyway for limiting the movement of the cameras relatively to the shutter mechanism.

12. In apparatus of the class described, the combination of two cameras, a lighting device intermediate the same, said cameras and lighting device being detachably attached to each other to provide a unitary structure, shutter mechanism telescoping said cameras, a threaded member attached directly to one of said cameras, the stem thereof being provided with a keyway, a key rigid with the shutter mechanism cooperating with said keyway for limiting the movement of the cameras relatively to the shutter mechanism, and a reinforced wire attached to said threaded member and projecting to the exterior of said apparatus for moving said threaded member relatively to said key, whereby the cameras and lighting device are moved relatively to said shutter mechanism and such movement limited.

13. In apparatus for photographing cavities, the combination of two cameras, a lighting device intermediate the same, said lighting device being provided with a refractory filament adapted to vaporize upon the application of current thereto to produce a glow discharge within said lighting device for illuminating the cavity being photographed.

14. In apparatus of the class described, the combination of a pair of tubular cameras, a lighting device intermediate the same, and a spring intermediate the lighting device and one of said cameras for insuring a good contact at each end of the lighting device.

15. In apparatus of the class described, the combination of a pair of tubular cameras, a lighting device intermediate the same, said lighting device including a cap, a solder resisting metal filament, a tapered electrode for holding the filament in place in said cap, and a spring intermediate one end of the lighting device in one of said cameras for insuring a good contact at each end of the device and for urging the electrode toward filament holding position.

16. In apparatus of the class described, the combination of a tubular camera and a film retaining spider removably mounted therein and adapted to release the films automatically upon removal of the spider.

17. In apparatus of the class described, a tubular camera, a shutter surrounding the same, the periphery of said camera being provided with a groove adjacent the end of the shutter, whereby upon movement of the camera relatively to the shutter a vacuum action is induced.

This specification signed this 19th day of February, 1929.

FRANZ G. BACK.